Patented Mar. 10, 1942

2,275,923

UNITED STATES PATENT OFFICE 2,275,923

DERIVATIVES OF FURFURAL AND METHOD OF MAKING

Henry L. Ross, New York, and Alfred W. C. Wroblewski, Bronx, N. Y.

No Drawing. Application December 29, 1939, Serial No 311,660

11 Claims. (Cl. 260—152)

This invention relates to derivatives of furfural formed by producing initially a condensation product of the aldehyde and then subjecting the condensation product to nitrating conditions. The invention relates, also, to derivatives formed when the nitrated condensation product is subjected to reduction, followed, suitably, by diazotization, either with or without subsequent coupling with such compounds as aryl amines or phenolic materials. The invention comprises in addition conversion of the coupled product to finished dye solutions. More particularly, the invention relates to such derivatives of condensation products of furfural with a phenolic material such as tannic acid.

The invention comprises the herein described new compounds and the method of making them.

In general, the preferred method is as follows: Furfural is condensed with itself or the phenolic material in the presence of a catalyst, such as an acid or an alkali, and the condensation product is nitrated, as with an aqueous solution of nitric acid. The resulting material may then be reduced, say, by acid and metal, the resulting product diazotized, and the diazotized product coupled with a compound known to undergo coupling reactions with diazonium salts.

The method makes possible the facile production of derivatives of the kind described.

As the phenolic material, there is used an aromatic compound in which one or more hydroxyl groups are attached to the aromatic nucleus. A compound so constituted is designated herein as a phenolic material. Among such materials that are useful for the present purpose are phenol or common carbolic acid, resorcin, the naphthols, pyrogallol, and tannic acid, the latter giving particularly favorable results when used in accordance with our invention.

In place of the tannic acid, tannin may be used when the ingredients of tannin other than tannic acid do not constitute a serious disadvantage in the product to be made or when those other ingredients can be separated readily from the said product to an extent satisfactory for the purpose for which the derivative is to be used.

Except as noted herein, the details of the various steps in the method of arriving at the desired derivatives are conventional. This applies to the making of condensation products of furfural, the nitration of cyclic material of the kind produced by the condensation, the reduction and diazotization, and the coupling of the diazotized material with coupling agents.

The method will be illustrated in detail by reference to the use of furfural and tannin as the raw materials. It is to be understood, however, that known equivalents may be substituted for those materials (except furfural and tannin) that are employed in the various steps of the method, chemically equivalent amounts of such materials being substituted for those given in the examples. Unless otherwise stated, all proportions herein are expressed as parts by weight.

Condensation

Fifty parts of tannin are mixed with one hundred parts of furfural and twenty parts of commercial concentrated hydrochloric acid solution, the latter being a catalyst or condensation agent. The mixture is heated to boiling under a reflux condenser for about twenty minutes or so. There is thus produced a black resinous condensation product. This is washed with water to remove excess of hydrochloric acid, and then is filtered, as on a vacuum filter, to separate the resinous material largely from the liquid which passes through the filter.

In a modification of the condensation reaction thirty-five parts of commercial concentrated ammonium hydroxide solution are substituted for the hydrochloric acid above. The mixture is allowed to stand at atmospheric temperature, say, for about a day, after having been first refluxed for about an hour. There is produced a brown resinous condensation product. This material is washed with water until substantially free from ammonium hydroxide, after which the material is separated by filtration from the associated liquid.

Nitration

The condensation product made in either manner described is nitrated. This is effected by stirring the resinous material with a solution containing about fifty parts of nitric acid and fifty parts of water.

The nitration is conducted, advantageously, for about two hours at 10° C. The nitration mixture is then diluted, say, to fifteen per cent concentration of nitric acid and then allowed to stand at room temperature for approximately a day. A brownish mass is obtained.

The product so obtained from the nitration of the condensation product is filtered. Some of the nitrated material may go into solution and require recovery from the filtrate. The bulk of the nitrated product, however, is retained on the filter.

Reduction

The product obtained as described, by subjecting the furfural condensation product to nitrating conditions, is then reduced. For this purpose, the nitrated material is treated with an inorganic acid and a metal of high solution tension relative to hydrogen, adapted to liberate hydrogen from the inorganic acid or otherwise to cause reduction. Thus, there are used hydrochloric acid and iron, zinc, tin or like metal. The proportion of the acid and metal used is in excess of that calculated as required to give reduction to the amine stage and the reduction is promoted by heating under a reflux condenser, for an hour or longer. The resulting mixture is then subjected to distillation, the bulk of the distillate passing over at a temperature of about 95° to 120° C. and being of yellow to amber color. Before being distilled over, the material may be neutralized with calcium hydroxide, sodium carbonate, or the like.

Diazotization

Five parts of the distillate made as described above and representing the amine stage are treated with one part of hydrochloric acid, an excess of sodium acetate over the acid, and an aqueous sodium nitrite solution of concentration twenty per cent, at a temperature of approximately 5° C. or below. A diazonium salt is produced.

Coupling

The diazonium salt is then coupled with a coupling agent, as, for example, with an aryl amine or a phenolic material, in accordance with usual coupling technique for diazonium salts. Thus, aniline, dimethyl aniline, monoethyl aniline, a naphthylamine, phenol, naphthol, and/ or cresol is stirred into the mixture of the reduced material, sodium nitrite, hydrochloric acid, and sodium acetate, either before or after diazotization is completed. The product is a mono-azo derivative of the product of condensing furfural with tannin.

Coupling ensues with the production of colored compounds suitable for use as dyes.

Dyeing

An example of the use of this invention is the making of dyes.

In a typical preparation in which the furfural and tannin are initially condensed in the presence of acid, the diazotized and coupled product, made as described with the use of aniline as the coupling agent, is dissolved in ten per cent aqueous sulfuric acid solution. A piece of silk immersed in the solution at the boiling point is dyed yellow.

Another example is the diazotized and coupled product of the reduction product of the condensation of tannin and furfural in the presence of ammonium hydroxide, with dimethyl aniline used as the coupling agent. The coupled material, appearing as a precipitate, is dissolved in ten per cent aqueous hydrochloric acid solution and sodium nitrite is added. Silk is dyed a golden brown by the solution.

If, in the last example given above, sodium thiosulphate is added in place of the sodium nitrite and if sulfuric is used in place of hydrochloric acid, the silk is dyed a blue green.

While derivatives made as described from furfural and tannin (or tannic acid) are particularly satisfactory, the tannin may be replaced in the condensation reaction by another phenolic material, as, for example, by one of those listed above. In such case, the method used is the same as illustrated in detail above, except for the said substitution in the condensation step.

For some purposes the phenolic material may be substituted by an aryl amine, as, for example, by aniline, methyl or ethyl aniline (mono- or di-), paraphenylene diamine, or alpha naphthylamine.

An example of the substitution of the phenolic material in the condensation reaction by an aryl amine is the following: Five parts of the aryl amine, say aniline, five parts of furfural, and one part of commercial concentrated hydrochloric acid solution are refluxed for an hour and the resulting condensation product is subjected to nitrating and other steps, as illustrated above.

For other purposes furfural may be condensed with itself, to give the initial condensation product. Thus one hundred parts of furfural are heated with twenty parts of commercial concentrated hydrochloric acid solution under refluxing conditions, say for twenty minutes or until condensation is effected. The resulting product is a black resinous material. This is washed to remove acid and filtered, the condensation product being largely retained on the filter. The material so retained is then substituted for the condensation product of furfural and tannin, in the various steps subsequent to condensation in the detailed example given above. The nitration product, produced by condensing furfural with itself and then nitrating, is black.

The various new products described herein are useful as raw materials for the making of dyes or dye intermediates or as finished dyes, the use depending upon the number of steps in the above method to which a given product has been subjected. Depending upon the use to which the products are to be put, the treatment according to the method steps given may be discontinued after the condensation product has been (1) nitrated, (2) reduced, (3) diazotized, (4) coupled, or (5) made into a finished dye solution.

It will be understood that a mixture of nitric acid, sulfuric acid, and water may be substituted for nitric acid solution or the concentration of the latter may be varied, in making the nitration of the original condensation product.

Temperatures and other conditions under which reaction is effected in the various steps may also be varied. In general, the conditions chosen are those usually selected in making, respectively, nitrobodies from aromatic or cyclic compounds, reducing a nitrocompound to the amine stage, diazotizing and coupling the amine, and converting the product of the coupling to a dye solution.

By the term "diazotization" as used herein is meant the reaction of a nitrite in the presence of an excess of hydrochloric acid or the like on the product of the reduction of the nitrated condensation product made as described.

It will be understood that the details given are for the purpose of illustration, not restriction, of the invention and that variations within the spirit of the invention are intended to be included within the scope of the appended claims.

What we claim is:

1. A composition of matter comprising a compound selected from the group consisting of nitro, amino, diazonium and mono-azo derivatives of a condensation product of furfural with a cyclic compound selected from the group consisting of phenolic materials, aryl amines, and furfural, the mono-azo derivative being the product of coupling of the diazonium derivative of the condensation product with an aromatic coupling agent.

2. A composition of matter comprising the nitro derivative of a material selected from the group consisting of condensation products of furfural with phenolic materials, aryl amines, and furfural.

3. A composition of matter resulting from condensing furfural with a phenolic material and nitrating the product of the condensation.

4. A composition of matter resulting from condensing furfural with a phenolic material, nitrating the product of the condensation, and reducing the nitrated material.

5. A composition of matter resulting from condensing furfural with itself and nitrating the product of the condensation.

6. A composition of matter resulting from condensing furfural with itself, nitrating the product of the condensation, and reducing the nitrated material.

7. A composition of matter resulting from the condensation of furfural with tannic acid in contact with an acid catalyst of the condensation and nitrating the condensation product.

8. A composition of matter resulting from the condensation of furfural with tannic acid in contact with an alkali catalyst of the condensation and nitrating the condensation product.

9. The method of making a composition of matter which comprises heating furfural in the presence of a condensation catalyst so as to form a condensation product of furfural with itself, and nitrating the said product.

10. The method of making a composition of matter which comprises heating furfural in the presence of a condensation catalyst so as to form a condensation product of furfural with itself, nitrating the said product, and reducing the nitrated material.

11. The method of making a composition of matter which comprises heating a mixture of furfural and tannic acid in the presence of a condensation catalyst and reacting the product of the heating treatment with aqueous nitric acid, to produce nitration.

HENRY L. ROSS.
ALFRED W. C. WROBLEWSKI.